ELECTRICAL MEMORY DEVICE

Filed Feb. 5, 1957

3 Sheets-Sheet 1

INVENTOR.
Albert E. Slade

BY
Robert S. Crooks
ATTORNEY

ELECTRICAL MEMORY DEVICE

Filed Feb. 5, 1957 3 Sheets-Sheet 2

INVENTOR.
Albert E. Slade

BY

Robert G. Cooke

ATTORNEY

Sept. 12, 1967 A. E. SLADE 3,341,827

ELECTRICAL MEMORY DEVICE

Filed Feb. 5, 1957 3 Sheets-Sheet 3

INVENTOR.
Albert E. Slade

BY

Robert G. Crooks
ATTORNEY

United States Patent Office 3,341,827
Patented Sept. 12, 1967

3,341,827
ELECTRICAL MEMORY DEVICE

Albert E. Slade, Cochituate, Mass., assignor to Arthur D. Little Inc., Cambridge, Mass., a corporation of Massachusetts Filed Feb. 5, 1957, Ser. No. 638,356
6 Claims. (Cl. 340—173.1)

My invention relates to electrical memory devices and to methods for employing circulating electric currents for storing information.

More particularly, my invention relates to electrical memory devices employing the phenomenon of superconductivity, and to methods for establishing and detecting currents in superconductive materials, thereby storing and reading out information.

In the field of data processing, which is assuming rapidly increasing importance, it is often necessary to provide devices for the storage of digital information. Such storage devices must be capable of "remembering" a large number of "bits" of digital information and of making such information available for further processing. Consequently, storage devices have come to be known popularly as "memories" and will be referred to as "memories" in this specification.

In general, a memory should have a number of "addresses," at each of which a "bit" of digital information may be recorded for future reference. Each bit of information, of course, resides in an element which may be in one or the other of two states and thus may represent "yes" or "no," "plus" or "minus," "zero" or "one," or any other choice of two possibilities. Inasmuch as it has become common practice to designate binary digital states as either "zero" or "one," that convention will be followed in this specification.

Memories have been devised in which there is located at each address, or information-storage point, a magnetic core which may be magnetized in either one of two directions, depending upon whether the information to be remembered at that address is a zero or a one. A memory has also been devised in which the bit of information remembered at each address is indicated by the condition of a "flip-flop" at that address, the state of an element of the flip-flop being either one of superconductivity or one of finite conductivity. A memory of this type is disclosed by Dudley Buck in his article, "The Cryotron—A Superconductive Computer Component," Proceedings of the Institute of Radio Engineers, vol. 44, No. 4, April 1956. While a memory of the type disclosed by Dudley Buck is satisfactory for many purposes, the circuitry required for storage of each bit of information in a memory of that type is not as simple as might be desired, and the speed with which information may be recorded and "read out" is not as great as in some other types of memories.

Accordingly, it is an object of my invention to provide a memory taking advantage of the phenomenon of superconductivity and having comparatively simple circuitry.

It is another object of my invention to provide a memory utilizing superconductivity, and permitting reasonably fast recording of information and fast access to information stored therein.

It is a further object of my invention to provide simple means and a method for recording information in a superconductive memory and for reading out the information as desired.

Briefly, I fulfill these and other objects of my invention by employing a superconductive material having addresses, at each of which a current may be caused to circulate in either of two rotational directions. By circulating current is meant a current, usually direct current, which will flow in a closed superconductive loop such as a torus or a toroidal volume of a sheet, the circulating current being characterized in that it continues to flow without an applied electromotive force such as a battery. Circulating current, as further disclosed herein, may be established in a manner analogous or like induction, that is by applying a magnetic field to a superconducting loop so as to induce a current in the loop. If the current continues to flow only while the magnetic field is applied it is considered to be circulating current of a first kind. If it continues to flow after the magnetic field is removed it is considered to be "persistent" or "remanent" circulating current, as more fully appears from the following description. Both a device carrying circulating current of the first kind and a persistent current device involve a closed loop or circuit of superconductive material which at sometime is wholly superconducting. The superconductive material may be in the form of a thin sheet of sufficient size to accommodate a large number of addresses, or may comprise a large number of separate pieces such that each address is located in a separate piece of material. Information may be recorded, or "read into," the material at a given address by applying and removing a magnetic field to the material at that address, such magnetic field being of sufficient intensity to produce at least partial temporary "quenching" of the material at that address. "Quenching" may be defined as the rendering finite of the resistivity of superconductive material. The magnetic field may be applied at a desired address by means of a pulsed coil at the address or by pulsed signal conductors passing close to the desired address. If desired, a matrix of conductors may be employed, whereby only the address located at the intersection of two pulsed conductors will be quenched, leaving unaffected all addresses not so located. Information may be read out from any given address by applying a magnetic field at the address, as in recording, and noting whether or not the circulating current at that address changes its direction.

For additional objects and features, and for a full understanding of my invention, attention is now directed to the following detailed specification and claims, together with the drawings, in which:

Figure 1:
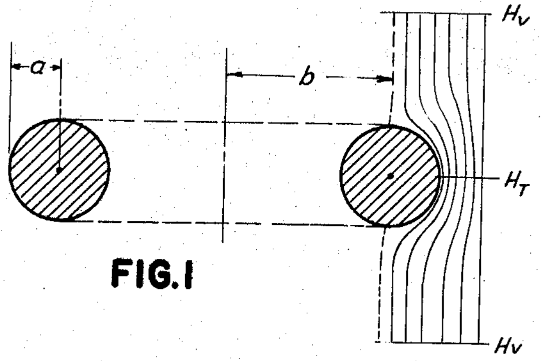
FIG. 1 is a sectional view of a toroidal body which may be useful in explaining the phenomenon of circulating currents in superconductive material.

Turning to FIG. 1 of the drawing, we may, in explaining the basic principles of my invention, employ a toroidal body capable of superconductivity and having a cross-sectional radius *a*. For purposes of illustration, let us assume that the radius of the toroid itself is *b*, and that *b* is much larger than *a*. As explained on pages 482 and 483 of Buck, "The Cryotron—A Superconductive Computer Component," Proceedings of the Institute of Radio Engineers, vol. 44, No. 4, April 1956, superconductivity of a material means that the material has infinite conductivity. The existence or non-existence of superconductivity in a material depends upon the temperature of the material and the magnetic field intensity applied to the material. In general, either an increase of temperature of the material or an increase of applied magnetic field beyond certain levels tends to destroy superconductivity of the material. Now, if a toroid of material capable of superconductivity is maintained at a constant temperature which, in the absence of applied magnetic field, would render the material superconductive, there is a definite value of uniform magnetic field intensity which would be sufficient to "quench" the material, or render its conductivity finite. Such a value of uniform magnetic field intensity, for a temperature level, may be called $H_T$. Thus $H_T$ has a definite value for each superconductive material at, for instance, 4.2 degrees Kelvin, the temperature of liquefied helium at atmospheric pressure.

For a body of configuration such as the toroid of FIG. 1, due to the tendency for lines of applied magnetic field to be concentrated close to the outer periphery of the toroid, a uniform "ambient" magnetic field smaller than $H_T$ can produce quenching of points on the outer periphery of the toroid. Such smaller level of ambient magnetic field may be called $H_v$, and bears a relationship to $H_T$ which is determined by the configuration of the body, i.e. the ratio $a/b$ in the case of the toroid.

A circulating current may be established in a superconducting body, e.g. the torus of FIG. 1, by applying to the body and removing a magnetic field. However, in order to have any persistent current circulating in the body after removal of the magnetic field therefrom the magnitude of the uniform applied magnetic field must be at least $H_v$, thereby producing quenching of at least part of the body. As was explained in the preceding paragraph, a uniform "ambient" magnetic field of intensity $H_v$ is defined as that value of uniform magnetic field which will be just sufficient, in the case of a given superconductive body, to initiate quenching of the body at the point or points of the body where the magnetic field becomes most concentrated.

No body in its superconductive state can support within it any lines of magnetic flux. Consequently, a body such as the toroid of FIG. 1 may be visualized as deflecting the lines of magnetic field from its outer periphery and concentrating the lines to such an extent that an ambient magnetic field of intensity $H_v$ produces a field of intensity $H_T$ at the outer periphery of the toroid. Such a field is sufficient to initiate quenching at the outer periphery of the toroid. It will be understood that only a small portion of the uniform ambient magnetic field is shown in FIG. 1, and that the illustration is employed merely for the purpose of pointing out the consequences of the important fact that no lines of magnetic flux can appear within any superconductive portion of any body.

Figure 2:
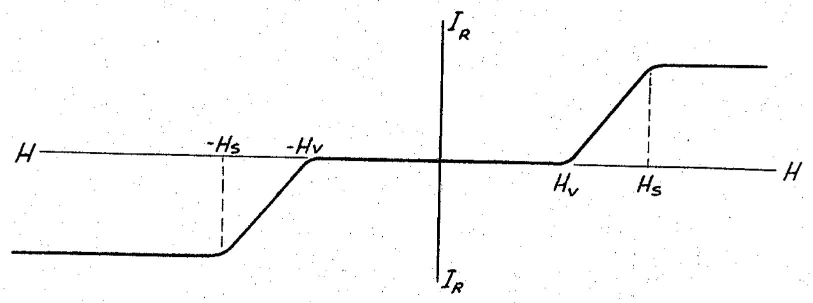
FIG. 2 is a plot of the strength of persistent circulating currents which may be established, in a body such as that shown in FIG. 1, by applying and removing magnetic fields of various intensities.

Having sufficiently emphasized the absence of magnetic flux within superconductive material, we are now ready to refer to FIG. 2, which is a plot of the magnitudes of "remanent" current which may be established in a body by application to and removal from the body of various values of uniform "ambient" magnetic field. The first fact which FIG. 2 illustrates is the fact that application and removal of any uniform ambient magnetic fields of intensity smaller in magnitude than $H_v$ do not result in the establishment of any circulating persistent current in a superconductive body. Such a circulating persistent current, which might be termed a "remanent" current, can be established only by application of a uniform ambient magnetic field of intensity at least equal to $H_v$ in magnitude, or by otherwise causing a field of magnitude $H_T$ to exist temporarily at some parts of the superconductive body. Stated in other terms, FIG. 2 illustrates the fact that no remanent current can be established in a superconducting body except by application and removal of a magnetic field sufficient in intensity to produce quenching of at least part of the body.

FIG. 2 also illustrates that, as the intensity of a uniform ambient magnetic field applied to and removed from a superconductive body is increased, the magnitude of the remanent current increases up to a certain point but eventually reaches what might be called a "saturation" value when the applied field has an intensity which might be called $H_s$. The "saturation" effect may be attributed to the magnetic field associated with the remanent current itself. As the magnitude of remanent current increases, the magnitude of the associated magnetic field increases proportionally, thereby tending to produce continued quenching of the material. Because of the tendency of induced currents to produce magnetic fields which, if of sufficient magnitude, could cause quenching of the superconductive material, it is found that the remanent currents do not flow in the *interior* of superconductive bodies but tend to flow near the *surface*, where magnetic fluxes produced by the currents are not so likely to be concentrated to the extent of causing quenching of the material.

The nature of the changes of magnitude and direction of remanent currents may best be illustrated by reference to FIG. 3, which is a plot of representative magnetic moment M in a body, as a function of the ambient magnetic field H. It will be understood that the magnetic moment of a circulating current is a measure of the strength of the circulating current in any given body. By way of example, it may be assumed, once again, that the body employed is a torus so that the path of the circulating current will be obvious. It may be worth reiteration that the value of $H_T$ for any such body is a characteristic of the material of the body, and the value of $H_v/H_T$ is a function of the shape of the body. It may be assumed, by way of illustration, that the body is composed of some metal such as tantalum, and that the body is immersed in liquefied helium at atmospheric pressure, thereby maintaining the temperature of the body at substantially 4.2 degrees Kelvin, at which temperature tantalum is superconductive in the absence of a magnetic field. Helium in the gaseous state may be liquefied by means of a machine bearing the trademark "Cryostat," as produced and sold by Arthur D. Little, Inc., Cambridge, Massachusetts. It will, of course, be understood that a plane sheet, or other configuration of material, might be substituted for the torus, that metals such as lead or vanadium might be substituted for tantalum, and that temperatures other than 4.2 degrees Kelvin might be employed. By fixing these parameters for purposes of illustration, we are able to sketch a representative form of plot of magnetic moment as a function of ambient magnetic field.

Figure 3:
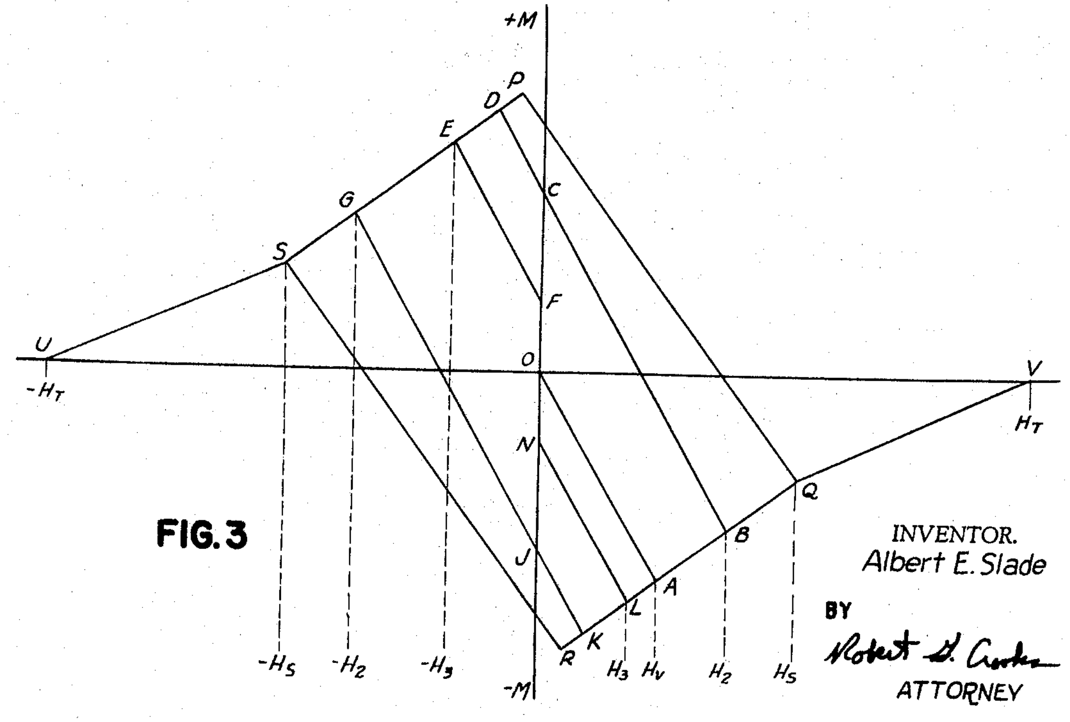
FIG. 3 is a representation of various typical excursions which may be executed by the magnetic moment of a body such as that shown in FIG. 1, as the magnetic field applied to the body is varied.

In FIG. 3, let us assume that our illustrative body has been cooled in the absence of magnetic field to such a temperature that the body becomes entirely superconductive, i.e., that a small test current flowing anywhere in the body would encounter zero resistance. The shape of the plot of magnetic moment as a function of ambient magnetic field will depend upon the choice of polarity convention. If the polarity convention chosen is such that a small "positive" applied magnetic field induces a small "negative" circulating current and magnetic moment, an excursion along segment OA of FIG. 3 would represent the application of such a small magnetic field. If such applied magnetic field is smaller in magnitude than $H_v$, the application and removal of the field will not result in any remanent current in the body. Differently stated, the application and removal of a field smaller than $H_v$ will result in a reversible excursion from point O toward point A and back to point O. If the effect on the magnetic moment of the body were measured with a ballistic galvanometer, the net (integrated) deflection of the galvanometer would be zero.

Now, if an ambient magnetic field greater than $H_v$ but smaller than $H_s$ (see FIG. 3) were applied and removed, a representative path would be from point O to point A to point B to point C, wherein the line OA is parallel to the line BC and the line AB is part of the boundary of a quadrilateral PQRS which is characteristic of this particular body. Point C represents a positive magnetic moment which remains after the magnetic field has been applied and removed. In this case, a ballistic galvanometer coupled to the test body and used as a pickup *would* show a net integrated deflection after the magnetic field had been applied and removed. Such integrated deflection would be proportional to the distance OC. Now, if a positive ambient field of magnitude $H_2$ (or any value less than $H_2$) were applied and removed, the excursion would be along line segment CB and would be reversible, terminating at point C. The integrated ballistic-galvanometer deflection for such an excursion would be zero. Similarly, application and removal of a negative ambient field of magnitude less than about ½ $H_3$ would cause a reversible excursion along line segment CD.

Now, if an ambient magnetic field of negative polarity and of magnitude $H_3$ (see FIG. 3) were applied and removed, the excursion of magnetic moment would follow the path CDEF, wherein CD is parallel to EF, and DE is part of the quadrilateral PQRS characteristic of that particular body. The remanent magnetic moment at point F is less than that at point C but has the same polarity. A ballistic galvanometer would indicate the excursion CDEF by a deflection proportional to the distance CF. Positive or negative magnetic fields of magnitude less than $H_3$ may now be applied and removed without producing any net change of magnetic moment, or net galvanometer deflection.

Now, if a negative magnetic field of magnitude $H_2$ is applied and removed, the magnetic moment would follow the path FEGJ, wherein GJ is parallel to OA, and would leave a *negative* remanent magnetic moment. The ballistic-galvanometer deflection corresponding to this excursion would be proportional to the distance FJ. Now, if a positive magnetic field of magnitude $H_3$ were applied and removed, the magnetic moment would follow the path JKLN, wherein LN is parallel to OA. The remanent magnetic moment would still be negative but would be reduced in magnitude. The integrated galvanometer deflection would be proportional to the distance JN. Application and removal of positive or negative fields smaller in magnitude than $H_3$ would then merely produce reversible magnetic moment excursions, with no net change in moment.

Finally, the application and removal of a positive magnetic field of magnitude $H_2$ would bring about the reversal of the remanent magnetic moment and would be represented by the excursion NLBC. The corresponding ballistic-galvanometer deflection would be proportional to the distance NC. Thus, application of a positive magnetic field would have achieved reversal of the remanent magnetic moment from negative to positive. The excursions of magnetic moment which have been outlined are representative, and illustrate the behavior of superconductive bodies to which magnetic fields are applied, and subsequently removed. All the illustrative excursions have been within the quadrilteral PQRS, which is characteristic of this particular body. If magnetic fields larger in magnitude than $H_s$ (see FIG. 3) were applied and removed, the possible excursions of magnetic moment in this body would be limited to the area of quadrilateral PQRS, together with line segments QV and SU. It is to be noted that application and removal of fields larger in magnitude than $H_s$, or even greater than $H_T$ (see FIG. 3) for that matter, produce net changes of magnetic moment no larger than those which are producible by a magnetic field of magnitude $H_s$.

Having explained the behavior of remanent currents and magnetic moments under the influence of the application and removal of ambient magnetic fields of various magnitudes, we are now ready to describe in detail how this behavior may be utilized in the design of various configurations of persistent-current memory device, according to my invention. As has been stated in earlier paragraphs, a body in which remanent magnetic moments of either sign may be established is a device capable of remembering one bit of digital information—either "zero" or "one." Furthermore, inasmuch as such magnetic moments and remanent currents are *persistent*, such a body is a *bistable* device. Switching of the body from a magnetic moment of one polarity to a magnetic moment of the other polarity does not have the aid of any regenerative effect such as that which characterizes vacuum-tube flip-flops, or the cryotron flip-flops as disclosed by Dudley Buck. Nevertheless, the device according to my invention is bistable, and may take on many forms, including that of the torus used in the preceding paragraphs for purposes of illustration.

Figure 4:
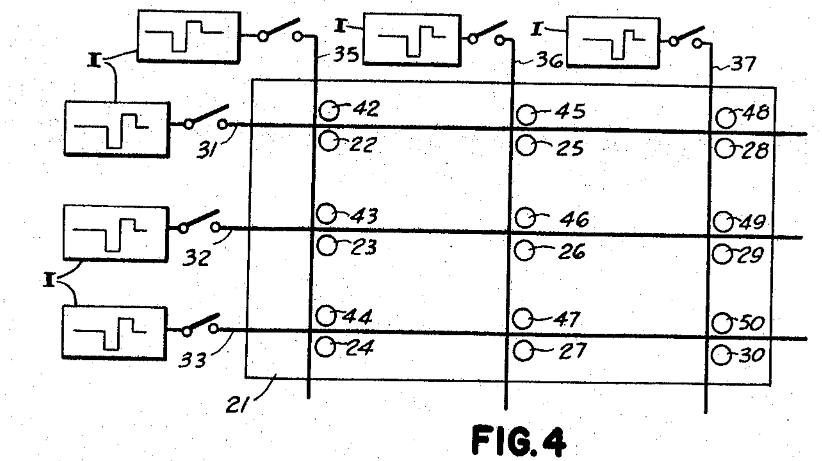
FIG. 4 is a plan view of a device according to my invention, being a configuration in which circulating currents flow in a sheet of material rather than in a toroidal body.

One of the forms which may characterize the memory according to my invention is shown in FIG. 4, which includes a sheet 21 of material capable of superconductivity. On one side of sheet 21 may be arranged a number of conductors 31, 32, and 33, each of which is connected to a signal source not shown. On the same side of sheet 21 as conductors 31, 32, and 33 may be a further number of conductors 35, 36, and 37, each of which is connected to a signal source I. While it is convenient to arrange conductors 31, 32, and 33 perpendicular to conductors 35, 36, and 37 as shown, such an arrangement is by no means necessary. The purpose of these conductors is to carry currents which in turn apply magnetic fields to localized portions of sheet 21. By employing a matrix of conductors of two sets such that respective conductors of one set cross the respective conductors of the other set at predetermined locations on sheet 21, it is possible to produce in sheet 21 a magnetic effect which, at each crossing of the conductors, is substantially equal to the vector sum of the respective magnetic effects due to currents in the conductors crossing at that particular point. By applying currents to one particular conductor of each set, each such current *by itself* being of insufficient magnitude to produce a remanent current in conductive steel 21, I am able to produce at the crossing of the particular current-carrying conductors a magnetic field which *is sufficient* to bring about a remanent current in conductive sheet 21 at that one particular point. Stated in other words, and taking advantage of the terms defined in connection with the description of FIG. 3, I implement my invention by impressing upon conductors 32 and 36, for example, currents each of which by itself would apply to superconductive sheet 21 a magnetic field of magnitude smaller than $H_v$. Thus, upon removal of such currents from the respective conductors 32 and 36, the magnetic moment of most portions of superconductive sheet adjacent those conductors would return along the line AO (in FIG. 3) to point O. This fact signifies that, in sheet 21 adjacent most portions of conductors 32 and 36, there would be no remanent circulating current or magnetic moment. However, by virtue of the fact that the magnetic fields applied to sheet 21 adjacent the crossing of conductors 32 and 36 could together aggregate a magnitude in excess of $H_v$, removal of those input currents may leave a remanent current and magnetic moment in sheet 21 near that particular crossing of conductors. With the directions of the conductors as shown, it will be understood that the directions of the fields applied by the respective conductors at each crossing are not identical, and that the vector sum of those fields would have to exceed $H_v$ in order to leave the remanent current and magnetic moment in the sheet at the crossing. For instance, if the vector sum of the fields applied and removed at a given crossing were equal to $H_2$, the remanent magnetic moment in the superconductive sheet would be represented by point C in FIG. 3.

Figure 12:
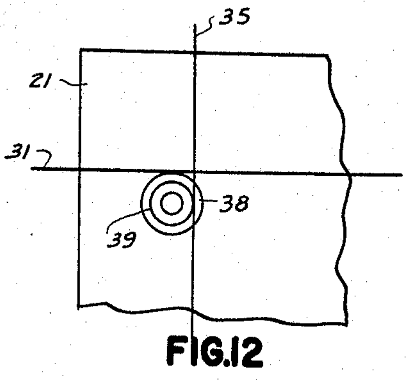
FIG. 12 is a plan view of a portion of a modification of the memory device of FIG. 4.

The embodiment of FIG. 4 suggests a number of modifications which may be made in order to improve the effectiveness of the device. For instance, as shown in FIGURE 12, conductors 31 and 35 should preferably be equipped respectively with coils 38 and 39, thereby impressing upon superconductive sheet 21 a magnetic field more intense than that which is obtainable by means of straight conductors. Coils 38 and 39 are typical of pairs of coils which may be employed at other crossings of the various signal conductors, and should be arranged concentrically in pairs and with their axes normal to the plane of superconductive sheet 21. According to another modification which might be made in the configuration of FIG. 4, the respective sets of signal conductors 31–33 etc. and 35–37 etc. might be arranged in a nearly parallel fashion, thereby augmenting the magnetic fields applied at each crossing beyond the magnitudes obtainable at the crossings of orthogonal conductors. Of course, in the case of conductors arranged in a nearly parallel fashion, care must be taken that the currents flowing in the respective conductors at the crossing are so directed that their magnetic fields "boost" each other rather than "bucking" each other.

One way to produce stronger fields at each crossing than those which would be produced by simple straight conductors is to coil each conductor at each crossing, with the axis of each coil substantially perpendicular to the plane of sheet 21. Thus, conductor 31, for instance, might be equipped with coils respectively at its crossings with conductors 35, 36, and 37. Likewise, conductor 35, for instance, would have similar coils respectively at its crossings with conductors 31, 32, and 33. A fragment of such a configuration of memory is illustrated in FIG. 12 and has already been briefly discussed in the foregoing paragraphs. While the configuration of FIG. 4 has a certain advantage of simplicity, the configuration of FIG. 12 has an advantage of added reliability and non-criticality of design. However, whichever configuration is desired may be employed within the scope of my invention.

Whichever configuration of signal conductors is employed, it will be understood that some reliable means for establishing and removing current pulses of desired magnitude and duration in the signal conductors is important. While such circuitry may be adapted at will to conform to the needs and resources of each particular circumstances, typical control circuitry for use with my memory may include vacuum-tube pulse generators and pulse amplifiers as shown in volumes 5 and 18 of the M.I.T. Radiation Laboratory Series (Glasoe and Lebacqz, Pulse Generators and Valley and Wallman, Vacuum Tube Amplifiers), both published in 1948 by McGraw-Hill Book Company. It will be understood that transistor pulse generators and amplifiers might alternatively be employed in place of the analogous vacuum-tube circuits. Much of the pulse circuitry employed in connection with magnetic-core memory devices may be adapted for use with persistent-current memory devices according to my invention.

An explanation has been presented in the preceding paragraphs in which emphasis has been given to the means and methods which may be employed in setting up persistent circulating currents or magnetic moments in the superconductive sheet 21 near the crossing points of respective signal conductors of the two sets. While the explanation has been presented in terms of the use of *two* sets of signal conductors, it will readily be appreciated that three or more sets of conductors might be employed if so desired, the only requirement being that net magnetic fields applied at desired ones of the crossing points be sufficient to exceed the magnitude $H_v$ for the material and configuration employed. It is even conceivable that certain sets of conductors might be employed for the purpose of producing additive magnetic fields whereas other sets might be employed for producing subtractive magnetic field. Such a configuration would make possible an inhibitor circuit, the type of circuit which in computer terminology is sometimes referred to as an "unless" circuit.

Having explained rather fully the means and methods for recording or "reading in" information in the form of circulating persistent currents or remanent magnetic moments in superconductive sheet 21, we shall now explain some means and methods for "inquiring" what information is present in the memory and for reading out such information. It has been pointed out that information may be stored in the memory, at least one bit at each crossing point of the signal conductors, by pulsing the conductors crossing at the desired point, the pulses being simultaneous and of carefully determined magnitude. The directions of the remanent persistent currents and magnetic moments are determined by the directions of the current pulses applied to the signal conductors in accordance with the basic rules of magnetic induction. Now, having established currents and magnetic moments of desired directions at desired ones of the crossing points, I must explain how to sense the presence and direction of those currents and moments and, hence, the information stored. In FIG. 4, there are represented by circles an array of sensing coils 22 through 30 and 42 through 50 arranged in pairs, each pair being near one of the crossing points of signal conductors of the sets 31 through 33 and 35 through 37. If desired, sensing coils 22 through 30 may be connected in series—circuit relationship with one another and with a suitable detection device. Likewise, if desired, sensing coils 42 through 50 may be connected in series-circuit relationship with one another and with a suitable detection device. If only one output circuit were desired, sensing coils 22 through 30 and 42 through 50 might all be connected together in one series circuit incorporating a suitable detection device. It will be noted that, at each crossing of simple straight signal conductors, a pair of circulating persistent currents may be established in sheet 21, these currents being in opposite quadrant with respect to the given crossing. Depending upon the polarities of the pulses applied to the signal conductors, the currents may be caused to circulate in either pair of opposite quadrants and in either direction (clockwise or counterclockwise) in those quadrants. By employing a pair of sensing coils at each crossing, the sensing coils being in *adjacent* quadrants, I am able to determine not only the directions of the persistent currents but also the quadrants in which they are located. If the design of the memory is such that recognition of the *quadrant locations,* as well as the directions, of the circulating currents is important, then the two sets of sensing coils 22 through 30 and 42 through 50 should not be connected together in one series circuit. If current pulses capable of establishing or altering circulating currents in sheet 21 are applied to signal conductors crossing at a given address, such establishment or alteration of circulating currents in the sheet may be detected by one of the sensing coils, so placed as to be linked by the magnetic flux of the circulating currents established or altered. Thus, when information is recorded in sheet 21, a voltage may be induced in a sensing coil corresponding to the crossing or address where the information is recorded. Furthermore, if an "inquiry pulse" is applied to the sheet at any given address, and if the inquiry pulse produces any net change in the circulating current or magnetic moment at that address, such net change is detectable by the sensing coil at that address. According to the principles of my invention, I prefer to employ an inquiry pulse of such magnitude that the same intensity of magnetic field is applied to the sheet as in the case of "reading in" or recording information. Of course, the *polarity* of the inquiry pulse is known. If the polarity of the inquiry pulse is such that a reversal of the circulating current and magnetic moment at that address in the sheet is produced, the corresponding sensing coil will have a voltage induced in it, indicating that the new, known direction of the circulating current and magnetic moment is opposite to that of the current and moment which were formerly stored at that address and which represented the bit of information at that address. To restate the inquiry process, if a pulse of known polarity and magnitude is applied at a given address and produces no change in the magnetic moment stored at that address, then the stored magnetic moment must have had a direction corresponding to the direction of the inquiry pulse. On the other hand, if the application of the inquiry pulse of known polarity and magnitude produces a reversal of the stored magnetic moment, then the direction of the stored magnetic moment becomes known as corresponding to a pulse of polarity opposite to that of the inquiry pulse. Of course, if for any reason it is desired to replace precisely the information that was stored at that address just before its reversal by the inquiry pulse, such replacement may be accomplished by means of an applied pulse of polarity opposite to that of the inquiry pulse.

Figure 5:
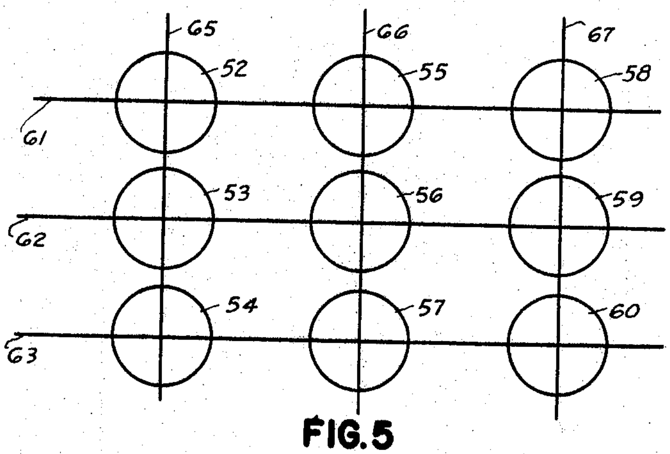
FIG. 5 is a plan view of another configuration of device according to my invention.

Although the most important principles of my invention have been set forth in the preceding paragraphs, a great many modifications, some of them rather important, may be made without departing from the scope of my invention. For instance, as is illustrated in FIG. 5 of the drawings, the circulating currents of my memory may be made to flow in a number of separate bodies, one body per address, rather than in a single sheet, as in FIG. 4. Such separate bodies might have the shapes of toroids or wafers and might appear as shown by reference numerals 52 through 60 in FIG. 5. Each such body may be positioned adjacent the crossing of signal conductors such as those shown at 61, 62, 63 of one set, and 65, 66, and 67 of another set. As was explained in connection with FIG. 4, there may be more than two sets of signal conductors if so desired. The conductors may be straight or coiled or deformed in order to concentrate magnetic flux at the addresses, and any desired arrangements may be made for pulsing the signal conductors, detecting changes in magnetic moments, or replacing information changed by inquiry pulses. It may be pointed out in that regard that, if only two types of information (i.e. 0 or 1) are permitted at any given address, the information that a given address has changed its condition and is now in "condition 1" is essentially the same as the information that the given address was in "condition 0" before it changed.

One of the most important refinements which I have incorporated into my invention relates to the nature of the pulses which are employed in recording and reading out information and in inquiring what information is present in the memory. The reader may recall that a magnitude of applied magnetic field suitable for the recording pulses has been designated as $H_2$, which is greater than $H_v$ but smaller than $H_s$, the "saturation" magnitude of applied magnetic field. It has further been suggested that the inquiry pulses should be of a magnitude equal to that of the recording pulses but of a uniform known polarity. In order to have access to any desired single address without disturbing information stored at other addresses, it is necessary that an inquiry pulse (i.e. the effect of pulses in two signal conductors crossing at the given address) be capable of reversing the direction of a magnetic moment stored at that address but that no effect be produced upon information stored at any other address than the one where the two pulsed conductors cross. Inasmuch as the magnetic field produced by the inquiry pulse at addresses other than the chosen one will be substantially equal to one-half $H_2$, it is necessary that a magnetic field of one-half $H_2$ be incapable of producing any change in magnetic moment at any address, regardless of the direction of the magnetic moment stored at that address. More specifically, not only must be a field of one-half $H_2$ be incapable of *reversing* any stored magnetic moment, but it must also be incapable of changing the *magnitude* of any stored magnetic moment. As it was observed in connected with the discussion of FIG. 3, a change of magnetic moment from point C to point F would produce a signal in a sensing coil, just as would a change of magnetic moment from point J to point N. If a stored magnetic moment corresponds to either point C or point J, an applied pulse of magnitude $H_2$ will either leave the stored magnetic moment unchanged or will reverse it from C to J or J to C, depending upon the polarity of the applied pulse. This is as it should be. Moreover, an applied pulse of magnitude equal to positive one-half $H_2$ will leave a stored moment C unchanged, and an applied pulse of negative one-half $H_2$ will leave a stored moment J unchanged. Again, these characteristics are as they should be. However, an applied pulse of negative one-half $H_2$ will change a stored moment C to a stored moment F, and an applied pulse of positive one-half $H_2$ will change a stored moment J to a stored moment N, where $|H_3|=|\frac{1}{2}\ H_2|$. These characteristics, if left uncompensated, would cause trouble because some pulses of magnitude $H_3$ would then be capable of producing signals in the sensing coils. Such signals from pulses of magnitude $H_3$ would be very undesirable.

Figure 6:
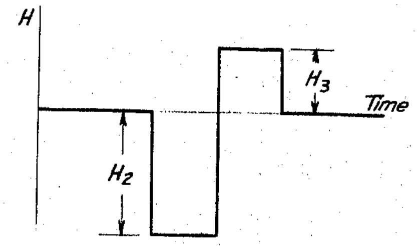
FIG. 6 is a representation of a typical complex current pulse which may be applied to a device according to my invention for the purpose of reading in or reading out information.
Figure 7:
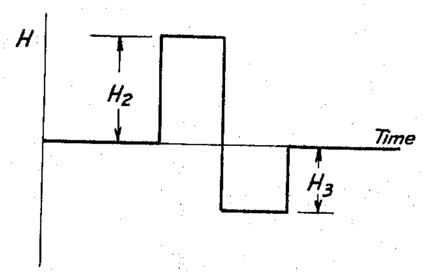
FIG. 7 is a representation of another polarity of complex current pulse which may be applied to a device according to my invention.

My solution to the above-described problem is to follow each pulse of magnitude $H_2$ by a pulse of magnitude $H_3$ and of the opposite polarity, as shown in FIGS. 6 and 7. Such a pulse might easily be approximated by the output of a blocking oscillator. Referring to FIG. 6, which illustrates a composite pulse of the type described, a recording pulse of negative $H_2$ followed by an after-pulse of positive $H_3$ would cause an excursion on the plot of FIG. 3 which would establish a magnetic moment represented by point J, and then reduce the magnitude of the moment to that represented by point N. A recording (or inquiry) pulse of the polarities and magnitudes illustrated in FIG. 7, on the other hand, would establish a magnetic moment represented by point C, and then reduce the magnitude of the moment to that represented by point F. It will be noted that application of further composite pulses of the character of either FIG. 6 or FIG. 7 will leave the memory unit in a condition represented either by point F or point N. That is, while the direction of the moment may be altered, there will be no set change of *magnitude* by any such composite pulse. Furthermore, and this is most important, no pulse of magnitude $H_3$ and of either polarity, applied to a memory unit in condition F or condition N, will produce *any* net change in the condition of the memory unit. Thus, no output signal will be produced in the sensing coils by any signal input pulse of magnitude $H_3$, regardless of the polarity of the pulse.

Figure 8:
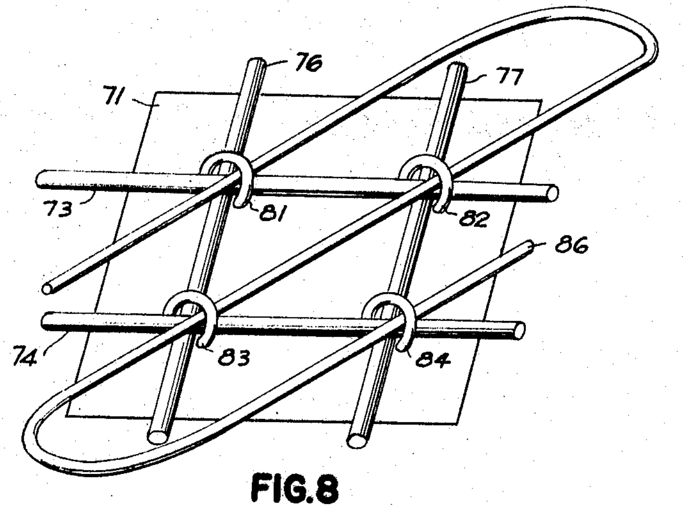
FIG. 8 is a perspective view of a configuration of device according to my invention, in which means are provided for concentrating magnetic flux produced by pulses applied to a matrix of signal conductors.

In earlier paragraphs of this specification, it was pointed out that the signal conductors might be formed into coils at the respective addresses of the memory, thereby concentrating the available magnetic flux at the desired locations. Another way of achieving such concentration of magnetic fluxes at the addresses is illustrated in FIG. 8 of the drawing, in which a superconductive sheet 71 is crisscrossed by two sets of signal conductors 73, 74 and 76, 77, in a manner analogous to that in which the sheet and signal conductors are arranged in FIG. 4. However, in FIG. 8, "horseshoes" of magnetic material are provided at the respective crossings of the signal conductors. Such "horseshoes" 81, 82, 83, and 84 may have flat end faces pressed against sheet 71, and may cooperate respectively with four other similar horseshoes on the other side of sheet 71 (not shown), with flat end faces pressed against the other side of the sheet. Thus, a magnetic circuit is provided for concentrating the flux at each signal-conductor crossing, each magnetic circuit being broken only by the two short gaps where the magnetic flux passes through sheet 71. While the horseshoes may be formed of any magnetic material, iron is a very satisfactory and inexpensive material for this purpose. It will be noted that, for this method of flux concentration, a flux in the horseshoe magnetic circuit sufficient to produce quenching of portions of sheet 71 may bring about the establishment of *two* persistent currents or magnetic moments at each address. It is convenient to read out the information stored at the addresses, by means of a read-out conductor 86 such as is shown in FIG. 8. Read-out conductor 86 is threaded through the flux-concentration "horseshoes" and provides a means for producing an output signal whenever inquiry pulses applied at a given address by means of a pair of signal input conductors result in a change of the magnetic moment stored at that address. Read-out conductor 86 may be connected to a device which integrates, over the time of the voltage pulse, each voltage which is induced in read-out conductor 86. Thus "net" changes of flux linking read-out conductor 86 may be distinguished from "reversible" changes of flux which integrate to zero over the time of the flux change. It will be understood that read-out conductor 86 may be linked to *all* the memory addresses or to any desired number of such addresses.

If only one flux-concentration horseshoe is employed per address in the memory of FIG. 8, it may be convenient to employ for read-out purposes a sensing coil on the opposite side of sheet 71 from each such flux-concentration horseshoe. The axis of each such sensing coil may be aligned with an end of the flux-concentration horseshoe, thereby being positioned for detection of changes in currents circulating in the sheet about the end of the flux-concentration horseshoe.

It will be understood that the function of any sensing coil or read-out conductor is to be linked by the magnetic flux associated with the circulating currents at one or more addresses of the memory. If the circulating persistent currents in the memory were compared with the current flowing in the primary winding of a transformer, then the currents induced in the sensing coils of read-out conductor, upon changes of the circulating persistent currents, might be compared with the currents induced in the secondary winding of a transformer. The sensing coils or read-out conductor must be linked by the magnetic fluxes associated with the circulating persistent currents. To the extent that these fluxes are capable of changes sufficient to induce measurable voltages in the sensing coils or read-out conductor, such coils or conductor may be simply a single "turn" of wire linked by the flux. If the design is such that a higher induced voltage is required, the sensing coils or read-out conductor may comprise a number of turns and may be fed through or wrapped around flux-concentration devices such as the "horseshoes" shown in FIG. 8.

Figure 9:
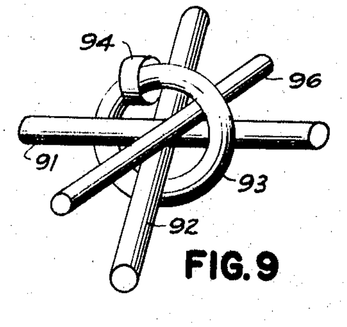
FIG. 9 is a perspective view of a configuration of my invention in which persistent currents circulate in a ring linked by another ring to the intersection of two signal conductors.

A somewhat different configuration of memory operatupon principles similar to those embodied in the memory of FIG. 8 is illustrated by the memory element shown in FIG. 9. This memory element, capable of storing one bit of information, comprises a signal conductor 91, a signal conductor 92, a flux-concentration ring 93 encircling the crossing of conductors 91 and 92, and a ring 94 linging flux-concentration ring 93. Signal conductors 91 and 92 are analogous to the signal conductors employed in the other configurations of my invention. Flux-concentration ring 93 may be of any magnetic material but should preferably be formed of a material of high permeability in order to have within it a substantial flux density. Ring 94 should be formed of a material capable of superconductivity, and takes the place of a portion of the super-conductive sheet, which has been employed in other configurations of my invention. In other words, instead of employing a superconductive sheet with an address for each crossing of the signal conductors, one may replace the sheet by a number of superconductive rings, each linked magnetically to a crossing point of signal conductors and constituting an address at which a bit of information may be stored. Thus, the superconductive sheet is, in effect, replaced by a number of superconductive rings. The principles of storage of information in superconductive rings are analogous to those employed in the storage of information in a superconductive sheet. Once again, the composite pulses illustrated in FIGS. 6 and 7 may be employed in order to endow each of the rings with the desired direction and magnitude of circulating current and magnetic moment. With respect to the read-out of information from memory units of the type illustrated in FIG. 9, a read-out conductor 96 may be passed through flux-concentration ring 93, thereby being magnetically linked to ring 94 and capable of sensing changes in persistent currents circulating in ring 94. It will be understood that signal conductors 91 and 92 may be connected to sources of appropriate input and inquiry pulses and that each of the signal conductors may be threaded through a number of flux-concentration rings, thus forming crossings with a number of other signal conductors respectively and forming an address at each crossing. It will also be understood that read-out conductor 96 may be threaded through a number of flux-concentration rings, at different addresses, and may be connected to a suitable detection device for registering voltage pulses induced in the conductor.

Figure 10:
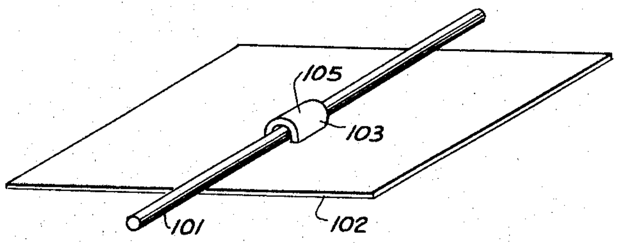
FIG. 10 is a perspective view of a device for concentrating magnetic flux applied to a sheet of material by a pulsed signal conductor.
Figure 11:
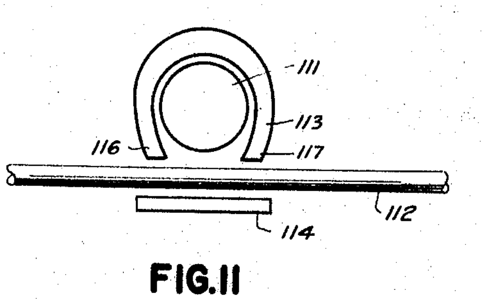
FIG. 11 is an elevation view of another type of flux-concentrating device.

Other modifications may be made within the scope of my invention, such as the flux-concentration devices shown in FIGS. 10, 11, and 12. In FIG. 10, a signal conductor 101 is linked magnetically to a superconductive sheet 102 by a magnetic horseshoe 103 embracing the signal conductor and having flat faces pressed against sheet 102. In order to accomplish a maximum of flux concentration, the horseshoe may be shaped as shown, so that the length of the flat faces parallel to conductor 101 is considerably less than the length of the yoke portion of the horseshoe parallel to conductor 101, i.e., so that the cross section of the horseshoe decreases as the opening of the horseshoe is approached.

An alternative configuration of flux-concentration device is shown in FIG. 11, in which a signal conductor 111, shown in end view, is linked magnetically to a superconductive sheet 112, or other object for carrying a circulating current, by means of a magnetic horseshoe 113 and a magnetic "keeper" 114. Magnetic keeper 114 provides a path for the magnetic flux emanating from the ends, 116 and 117, of magnetic horseshoe 113. Of course, the types of flux-concentration devices which may be employed will be determined by the configurations of signal conductors, superconductive objects, and read-out circuits which are employed. In general, where flux-concentration devices have been described as "magnetic" in the specification, the meaning conveyed is that the devices should be composed of material characterized by a relatively high value of magnetic permeability, such as iron. It is not necessary that the material be *magnetized* when installed.

With regard to materials which may be used in memory devices according to my invention, some latitude of choice is available. The properties of a number of materials capable of superconductivity are described in Dudley Buck's article to which reference has been made (Proceedings of the Institute of Radio Engineers, vol. 44, No. 4, April 1956, pages 482–493). More detailed information on the phenomenon of superconductivity is available in the book by D. Schoenberg entitled Superconductivity, published by Cambridge University Press, Cambridge, England in 1952. In general, I prefer that the signal conductors and other control circuits of the memory remain superconductive at all times during operation of the memory. Inasmuch as I find it convenient to operate the memory in a bath of liquefied helium at a temperature of 4.2 degrees Kelvin, I favor niobium as a material for the signal conductors. It would be possible, alternatively, to use vanadium or lead for such conductors. For the material in which quenching is to take place, I favor tantalum, which is quenchable by a moderate magnetic field at the temperature of liquefied helium under atmospheric pressure. As Buck pointed out in his article, the use of increased or reduced pressures changes the temperature of liquefied helium and permits more flexibility of choice of materials. However, operation of the memory at other than atmospheric pressure necessitates sealing of the liquid helium vessel and the electrical leads to the memory, such sealing not being necessary if the liquefied gas is maintained at atmospheric pressure.

A memory according to my invention may be operated inside a double Dewar flask, with the electrical leads to the signal conductors and detection apparatus passing through the opening of the flask. Liquefied helium may be placed in the inner chamber of the Dewar flask in which the memory is operated. The intermediate jacket of the double Dewar flask may be filled with liquefied nitrogen, thereby limiting severely the rate of heat leakage through the flask walls from the atmosphere to the inner chamber containing the liquefied helium. Liquefied helium, as stated in an earlier paragraph of this specification, may be obtained from a liquefier sold by Arthur D. Little, Inc. of Cambridge, Massachusetts under the trademark "Cryostat." Liquefied nitrogen may be produced from the atmosphereby means of an air liquefied also sold by Arthur D. Little, Inc. Alternatively, liquefied nitrogen is commercially available from a number of suppliers of compressed gases.

It should be borne in mind that the diagram of FIG. 3 is merely a typical diagram showing the characteristics of a sample memory element of a particular material. Inasmuch as the polarity convention describing the directions of magnetic fields and magnetic moments was arbitrarily chosen, the reverse convention might have been equally well chosen, in which case the shape of the diagram would be a mirror image of that which appears in FIG. 3. Application of a diagram of this type to a sheet having a number of currents circulating in it is an approximation which is permissible if the applied magnetic fields are confined to small areas and are not too close to one another. In other words, a superconductive sheet with a number of persistent currents may be treated as the equivalent of a number of current-carrying toruses if the currents flowing in the sheet are substantially isolated from one another. I have found that separations of one-fourth inch between the currents are generally adequate. The number of possible modifications of memory configuration is great, and each such modification of configuration might be such as to alter the shape of the diagrams of FIGS. 2 and 3. For instance, if the memory elements were built up by vapor deposition of signal conductors upon the sheet instead of by assembling preformed components, it would not be surprising if the shape of the diagrams of FIGS. 2 and 3 were affected.

While a number of preferred embodiments of my memory device and a number of variations of the method according to my invention have been described in the foregoing specification and illustrated in the accompanying drawings, it will be understood that still further modifications of my device and method may be made by those skilled in the art without departing from the essence of my invention. Accordingly, I have defined by means of the appended claims what I believe to be my novel and patentable invention.

What I claim as novel and desire to secure by Letters Patent of the United States is as follows:

1. A persistent current memory element comprising a body of material capable of superconductivity in the absence of a magnetic field, a pair of signal-input conductors adjacent said body of material, said pair of signal-input conductors crossing each other adjacent said body but not in conductive contact with each other or with said body, the crossing of said signal-input conductors defining four quadrants on the surface of said body, and at least a pair of sensing coils adapted to sense changes of currents circulating in at least a pair of adjacent ones of said four quadrants.

2. A persistent current memory element comprising a plurality of signal conductors, a read-out conductor, a flux-concentration device linking a crossing point of said signal conductors and said read-out conductor, and a body capable of superconductivity in the absence of an applied magnetic field, said body physically linking said flux-concentration device.

3. A persistent current device comprising at least one body forming a plurality of closed loops of material capable of superconductivity in the absence of a predetermined magnetic field, at least one signal-input conductor of a first set and at least one signal-input conductor of a second set respectively for inducing a current in each of said loops, each said loop being positioned adjacent one signal-input conductor of said first set and one signal-input conductor of said second set, said conductors being disposed so as jointly to apply their respective fields to said loops, in which signal-input conductors of said first set cross but do not conductively contact signal-input conductors of said second set, and in which at least one said body of material is fitted with a flux-concentrating device linked to an adjacent point of crossing of a signal-input conductor of said first set with a signal-input conductor of said second set.

4. A persistent-current device according to claim 3, in which at least one said flux-concentrating device is an annular member linking said body of material with said adjacent point of crossing.

5. A persistent-current device according to claim 3, in which at least one said flux-concentrating device comprises at least one horseshoe-shaped member.

6. A persistent current device according to claim 3, in which at least one said flux-concentrating device comprises a horseshoe-shaped member shaped so as to decrease in cross section as the opening of said horseshoe is approached.

References Cited

UNITED STATES PATENTS

| | | | |
|---|---|---|---|
| 2,666,884 | 1/1954 | Ericsson et al. | 340—173.1 |
| 2,725,474 | 11/1955 | Ericsson et al. | 250—25 X |
| 2,814,031 | 11/1957 | Davis | 340—174 |
| 2,832,897 | 4/1958 | Buck | 340—173 |

OTHER REFERENCES

"Some Experiments on a Superconductive Alloy in a Magnetic Field," pp. 935–941, 1935, by Casimir-Jonker et al., Physica, vol. 2.

"A New Superconducting Galvanometer," pp. 13–20, May 1936, by Smith et al. Transactions of the Royal Society of Canada.

(Other references on following page)

"Distribution of Magnetic Field Around Simply and Multiply Connected Supraconductors," pp. 132–146, 1937, Proceedings of the Royal Society of London by Smith et al.

"Superconductivity," pp. 19–25, June 1, 1946 (Hewlett), General Electric Review.

"A Magnetically Controlled Gating Elements" (Buck), pp. 47–50, Dec. 10–12, 1956, Proceedings of the Eastern Joint Computer Conference.

"The Cryotron—A Super Conductive Computer Component" (Buck), pp. 482–493, April 1956, Proceedings of the I.R.E.

EVERETT R. REYNOLDS, IRVING L. SRAGOW, J. P. VOGEL, J. P. VANDENBURG, N. N. JUNITZ, K. E. JACOBS, T. W. FEARS, *Assistant Examiners.*

BERNARD KONICK, *Primary Examiner.*